Patented Jan. 12, 1943

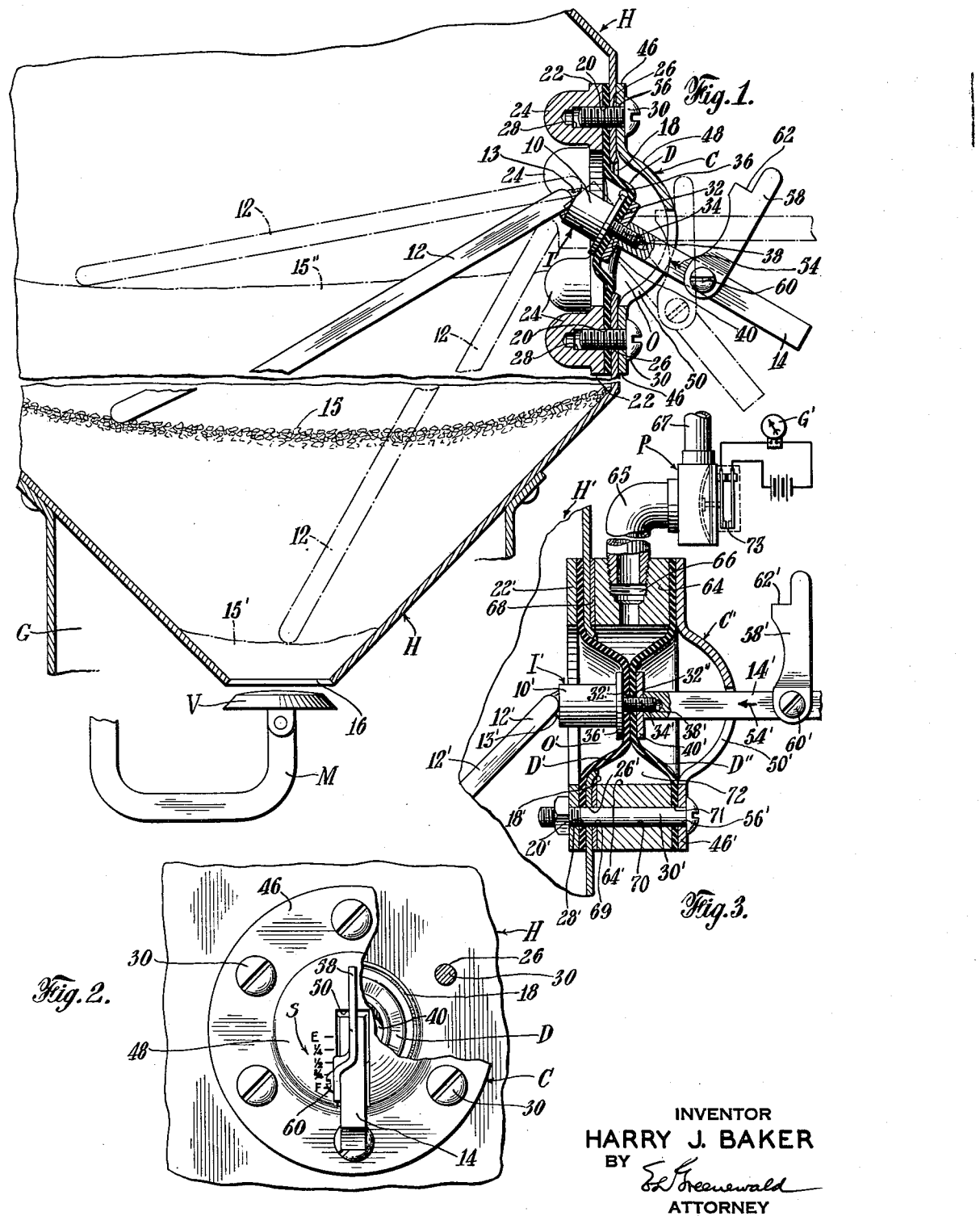

2,308,146

UNITED STATES PATENT OFFICE 2,308,146

DEVICE FOR INDICATING THE CONTENTS OF VESSELS

Harry J. Baker, Indianapolis, Ind., assignor, by mesne assignments, to Union Carbide and Carbon Corporation, a corporation of New York Application April 16, 1940, Serial No. 329,960

13 Claims. (Cl. 33—126)

This invention relates to an apparatus for indicating the height or level of granular or finely-divided material in a container or hopper, and more particularly to an apparatus for indicating the height or level of crushed or finely-divided calcium carbide in a hopper of an acetylene generator. The principles of this invention are also applicable to indicate, in a container or bin, the level of other material which may be powdered, semi-liquid or liquid.

In the process of generating acetylene, finely-divided or granular calcium carbide may be automatically supplied to the reaction chamber of the generator in amounts proportional to acetylene requirements. Such requirements fluctuate from time to time and without means for ascertaining the quantity of carbide in the hopper of the generator, it is difficult for the operator to determine the future or reserve generating capacity of such generator. Thus, in order to enable the operator to maintain the generator in proper condition and to avoid the possibility of a sudden cessation of the acetylene supply and subsequent loss of time before the acetylene supply can be restored, it is highly desirable to provide the carbide hopper of an acetylene generator with a smoothly operating indicating device which for purposes of safety and practicability must be both gas-tight and simple in operation.

Numerous devices have been proposed for indicating the amount of finely-divided material within a container, and particularly for indicating the level of calcium carbide within a hopper of an acetylene generator. Known carbide hopper indicating devices ordinarily comprise an element adapted to contact and to follow the downward movement of the surface of the carbide within the container, and means for transmitting such movement through a conventional stuffing box in the enclosure forming the container to an external indicating device. In order to prevent gas leakage between the movable shaft and the stuffing box it is customary to maintain the stuffing box bushing in relatively tight engagement against the packing surrounding the movable shaft. The friction imparted by the packing of the stuffing box and the ordinarily intermittent and slow lowering of the carbide level may cause the element to stick or remain in one position and not to follow the carbide surface; if the stuffing box bushing is loosened to eliminate this difficulty acetylene leakage may occur, particularly if the generator is operating at a pressure substantially above atmospheric pressure.

It has also been proposed, in a hopper indicating device, to dispose across an opening in the wall of such hopper a flexible diaphragm which is actuated by the weight or pressure of the material against the wall of the container and which is provided with means adapted for opening or closing an electrical signalling circuit. Such indicators are satisfactory for indicating the upper or lower levels of the material, but they are not adapted to indicate continuously the decrease in level of such material, and also they may be actuated by fluctuations in gas pressure within the container.

The apparatus of this invention overcomes these and other inherent disadvantages of known container or hopper indicators by providing a novel flexible gas-tight structure, disposed in a portion of the container, which is provided with means extending inwardly from and pivotal about an element of said flexible gas-tight structure for contacting the surface of the material within the container, and an element extending outwardly from the flexible structure and operably connected with the surface contacting means to indicate the height or level of the material within the container.

Among the objects of this invention are to provide apparatus for indicating the height or level of practically any material—granular, powdered, semi-liquid, liquid or the like,—and particularly crushed or free-flowing solid material in a container or hopper; to provide such indicating apparatus which will function effectively regardless of the rate at which the material is withdrawn from the hopper; to provide such apparatus which is gas-tight and effective in operation irrespective of pressure fluctuations within said container; to provide in a portion of the enclosure forming the carbide hopper of an acetylene generator a flexible diaphragm having means extending inwardly to contact and to follow the downward movement of the surface of said carbide, means extending outwardly from said diaphragm and connected to the surface contacting means to indicate the level of the carbide within said hopper, said flexible diaphragm forming a pivot to permit movement of the surface contacting and external indicating means as a unit; to provide a plurality of diaphragms in an opening of the enclosure forming the container, particularly the carbide hopper of an acetylene generator, said diaphragms being so arranged as to form a pivot for the movement of the indicating means; to provide a double diaphragm arrangement which permits pivotal movement of the indicating means while preventing leakage of acetylene from said hopper into the generating room in the event of failure of the innermost diaphragm, and to provide means for indicating the failure of the innermost diaphragm. Other objects and novel features will become apparent from the following description and accompanying drawing, in which:

Fig. 1 is a vertical sectional view of a typical embodiment of this invention as applied to the carbide hopper of an acetylene generator;

Fig. 2 is a front elevational view, partly in section, of the apparatus shown in Fig. 1; and Fig. 3 is a vertical sectional view of a modification of the device illustrated in Fig. 1.

Broadly, the indicating device of this invention comprises at least one flexible diaphragm D disposed across an opening O in the enclosure forming the hopper or container H, and indicating means I preferably secured in gas-tight relation to diaphragm D and adapted to pivot as a unit about an element of the latter. The indicating means I includes a diaphragm contacting element, such as a clamp 10, having one end in gas-tight connection with the inner surface of the diaphragm D and the other end formed integrally with or otherwise rigidly connected to a material surface contacting means, such as a rod 12. External indicating means, such as an arm 14 formed integrally with clamp 10, or suitably secured thereto, extends outwardly from the diaphragm D and moves in a direction opposite to that of material surface contacting rod 12. Both rod 12 and arm 14 pivot as a unit about a horizontal element of diaphragm D. The indicating member 14 cooperates with a suitable scale S on the cover plate C to indicate the level of the surface of the material within container H.

If the indicator device of this invention is to be used for heavy-duty purposes, for example such as those encountered in indicating the level of carbide in a hopper of a permanently installed medium pressure acetylene generator, it is desirable to use a double diaphragm arrangement as shown in Fig. 3, in which two diaphragms D' and D", spaced apart peripherally but clamped together or contiguously disposed at their centers form a gas-tight pivoting means for the indicating device I'. Any acetylene that might escape by failure of the innermost diaphragm D' enters an annular chamber 72, formed between the diaphragms D' and D" and the inner circumferential surface 64' of an annular member, such as a ring 64, and passes to the atmosphere through a suitable vent-pipe 65 secured to an orifice 66 in ring 64. If desired, the vent-pipe 65 may be provided with pressure indicating means P for detecting the escape of acetylene in the event of rupture of the innermost diaphragm. Pressure of gas within the hopper displaces the diaphragm or diaphragms to the right and by so doing places the latter under tension in such manner that the surface contacting rod 12 or 12', which is preferably heavier than arm 14, tends to be forced down onto the carbide surface 15, thus insuring positiveness to the action of the indicating device. The pressure of the gas within the hopper H against the diaphragm D or D' contributes considerably to the successful operation of the indicating device.

As illustrated in Fig. 1, a carbide hopper H of a conventional type of acetylene generator is arranged to supply carbide as needed to the generating chamber G of such generator. The hopper H may be adapted to be charged either from above or from the side, and to discharge carbide from the lower portion thereof through an opening 16, the flow being regulated manually or automatically by the movement of a valve V, or other similar regulating device, in response to the motion of arm M. The circular opening O, preferably having an outwardly extending edge 18, is provided at a convenient elevation in the wall of hopper H. The diaphragm D, having suitably spaced apertures 20 in the periphery thereof, is firmly held in place across the inner side of the opening O by an annular clamping ring 22. Ring 22 may be provided with a number of protruding bosses 24, disposed circumferentially about the interior of the ring coinciding in number and location with the apertures 20 and with suitably disposed apertures 26 in the wall of hopper H. Each boss 24 is provided with an internally threaded hole 28 extending substantially the depth of the boss to receive a screw 30, by which diaphragm D is firmly held against the inner side of hopper H.

The resilient, flexible diaphragm D, which may be composed of rubber, Duprene, impregnated cloth or other suitable material, acts as a gas-tight seal to prevent escape of acetylene through the opening O and at the same time forms a pivot for the indicating mechanism I. In the center, or at any other suitable place, diaphragm D is provided with an aperture 32 through which a threaded extension 34 of the diaphragm clamp 10 extends. The threaded extension 34 projects outwardly from the diaphragm D and provides a fastening means for the external indicating arm 14. Clamp 10 preferably has a circular cross-section and a flange 36 at the base of the threaded extension 34 to seal clamp 10 against the inner side of diaphragm D. The indicating arm 14, preferably square in cross-section, is provided with an internally threaded hole 38 in one end to receive the threaded extension 34 of clamp 10. A washer 40, having an outer diameter substantially equal to the diameter of the flange 36 and an internal diameter substantially equal to the diameter of the threaded extension 34, is disposed between the end of indicating arm 14 and the outer surface of diaphragm D. In assembling the unit, both the face of flange 36 and the side of the washer 40 in contact with diaphragm D are coated with rubber cement or similar adhesive material, so that when tightly assembled, a gas-tight structure is secured.

The rod 12 may be formed integrally with, or one end may be secured to the inner end of clamp 10 in a suitable manner, such as by a weld 13. Rod 12 extends inwardly at any desired angle from clamp 10 and is adapted to rest upon, and to follow the descent of the surface 15 of the carbide or other material in hopper H. Suitable material surface contacting means may be secured to the end of rod 12, if desired, to prevent the end therefor from sinking below the surface 15 of the material.

Secured to the outside of hopper H is a cover plate C, of substantially the same diameter as diaphragm D and annular member 22 and formed with a flange 46 and a protruding dome 48 having a slot 50 adapted to receive the indicating arm 14. Suitable indicating marks form a scale S which is disposed along the edge of the slot 50 and cooperates with an arrow or index mark 54 on arm 14 to indicate the amount of carbide within the hopper H. Cover plate C is provided with peripheral holes 56 corresponding in number and position with the holes 26 in hopper H, the holes 20 in diaphragm D, and with the internally threaded holes 28 in bosses 24 thus permitting screws 30, or other suitable fastening devices to pass through such holes and to secure the entire assembly in gas-tight relation with respect to the walls of hopper H. Before assembly, the face of the annular member 22 and the interior portion of hopper H adjacent the opening O, both of which contact the flexible diaphragm, are coated with rubber cement or other suitable adhesive material to obtain a gas-tight seal upon assembly of the indicator.

Indicating arm 14 is of such width as to move freely in the slot 50 of the cover plate C. An offset locking catch 58 is pivotally mounted on the indicating arm 14, such as by a screw 60. The upper portion of the catch 58 is formed with a rectangular notch 62, which may be placed in engagement with the upper end of the slot 50 to hold the member 12 in raised position during the hopper filling operation. As shown in Fig. 1, slot 50 is formed in cover plate C in such a manner as to guide the movement of indicating arm 14 and material contacting rod 12 in a direction substantially perpendicular to the axis of an element of the diaphragm forming a pivot for such movement. Slot 50 is also arranged to permit movement of indicating arm only while diaphragm D is flexed or distorted and the forces produced within the resilient diaphragm due to such distortion urge the latter to return to an undistorted condition; thus contacting rod 12 is continuously urged against the surface 15 of the material.

In the embodiment of the invention shown in Fig. 3, a flexible gas-tight structure comprising a pair of diaphragms D' and D'' is disposed across a central opening O', provided with an outwardly extending edge portion 18', in the enclosure of container H'. The diaphragms D' and D'' are spaced apart at their peripheral portions but are disposed in contiguous gas-tight relation to each other in their center portions to form a pivoting means for the indicating device I'. The periphery of diaphragm D' is firmly held against the inner surface of the enclosure H' by an annular ring 22' disposed against the rear peripheral portion of diaphragm D'. A relatively thick annular member such as a ring 64 having a threaded aperture 66, is disposed on the outside of and is separated from the surface of the enclosure H' by a suitable sealing gasket 68. The periphery of diaphragm D'' is held between the outer annular surface of ring 64 and a flange portion 46' on a dome-shaped cover plate C' to form a gas-tight assembly. Apertures 28', 20', 69, 70, 71, and 56' disposed respectively in ring 22', diaphragm D', gasket 68, annular member 64, diaphragm D'' and cover-plate C', all of said apertures corresponding in location and number to apertures 26' in container H', are adapted to receive a bolt 30' or other suitable fastening means to secure the diaphragm assembly in gas-tight relation to the interior and exterior surfaces of hopper H'.

Each of diaphragms D' and D'' have a centrally located aperture 32' and 32'' adapted to receive a threaded extension 34' of diaphragm contacting element or clamp 10'. At the base of the threaded extension 34' of clamp 10' a flange portion 36' is provided, the face of which is adapted to contact and to form a seal with the center portion of the inner surface of diaphragm D'. The left-hand end of diaphragm contacting member 10' may be secured as by a weld 13', or may be formed integrally with material surface contacting rod 12' at any desired angle. External indicating member or arm 14', provided with a suitably positioned off-set locking catch 58', and secured to member 14 by a screw 60', is provided in the left hand end thereof, with an internally threaded hole 38' adapted to receive the threaded extension 34'. Between the end of arm 14' and the outer surface of diaphragm D'' a washer 40' is disposed, the latter having an external diameter substantially equal to that of flange 36' and an internal diameter substantially equal to that of the threaded extension 34'. By screwing arm 14' on the threaded extension 34' both diaphragms D' and D'' are forced together in their centers to form a gas-tight flexible pivot for permitting motion of internal clamp 10' and external arm 14' as a unit, as well as forming a gas-tight annular chamber 72 with the inner circumferential portion 64' of the thick annular ring 64.

Cover plate C', external indicating arm 14' and off-set catch 58' are substantially identical respectively to cover plate C, external arm 14 and off-set catch 58 of the structure shown in Figs. 1 and 2 and it is to be understood that the same reference character primed designates a similar part previously described in connection with the embodiment of the invention shown in Figs. 1 and 2.

Cover plate C' is provided with a slot 50' which not only guides indicating arm 14' in a direction substantially perpendicular to the axis of a pivot formed by the diaphragms but permits movement of arm 14' only while both diaphragms are in a distorted condition. The resilient forces within the diaphragms have a tendency to urge the latter to return to an undistorted condition and by so doing cause contacting rod 12' to be continuously urged against the surface of the material.

With reference to Fig. 3, threaded aperture 66 preferably cooperates with a threaded portion of conduit 65 and the latter may have disposed therein means such as a pressure actuated valve P for detecting and indicating the leakage of acetylene through the inner diaphragm D'. The pressure actuated device P may comprise a conventional pressure operated diaphragm valve having a pair of electrical contacts 73, preferably completely enclosed, which are adapted to close an electrical circuit when the pressure in the conduit 65 reaches a predetermined value. The electrical circuit may include means, such as a lamp or indicating meter G', actuated by the closing of contacts 73. Conduit 67, secured to the discharge side of the pressure-actuated device P, vents excess acetylene, preferably to the exterior of the building within which the generating apparatus including hopper H' is located.

The method of operating each of the indicating devices shown and described in connection with Figs. 1 and 3 is identical and in the interest of brevity and clarity the method of operating the device shown in Fig. 1 will only be described. When the level of the carbide has reached a predetermined lower limit 15', or at any time that it is desired to charge the hopper, the operator pulls down on arm 14 and pushes catch 58 forward so that the notch 62 engages the upper end of slot 50 thus securing the mechanism against movement. Such a procedure raises the surface contacting end of rod 12 to a position near the top of the hopper during the filling operation. After the hopper has been charged with the desired quantity of carbide or other material, catch 58 is pulled back to a point where it does not engage slot 50. Indicating arm 14 is permitted to move upwardly, thus lowering rod 12 until it comes in contact with the carbide surface 15''. The arrow 54 on arm 14 then indicates on scale S the amount of carbide in the hopper. As the carbide level falls due to the flow through valve V, surface contacting rod 12 moves downwardly and produces a corresponding upward movement of arm 14 which, by means of arrow 54 and indicating scale S, continuously indicates the amount of carbide in hopper H. When the carbide level reaches a predetermined lower limit 15' the cycle above described may be repeated.

The flexible diaphragm D permits smooth and almost frictionless operation of the indicator of this invention while eliminating the risk of acetylene leakage. By varying the shape and length of the surface contacting rod 12, and the angle at which it is welded to or integrally formed with member 10, this indicator may be employed to indicate the level of practically any granular, powdered, semi-liquid, liquid or similar free flowing material within a container.

It will be also understood that two or more indicators of the type hereinbefore described may be disposed within a hopper or other container and that the structure, form and relative arrangement of the features of the indicating device of this invention may be different from that shown without departing from the essence of the invention within the scope of the appended claims.

What is claimed is:

1. Apparatus for indicating the level of material within a container comprising, in combination, flexible diaphragm means forming a portion of said container; means extending inwardly from said flexible diaphragm means for contacting the surface of said material; and indicating means extending outwardly from said flexible diaphragm means and operably connected with such surface contacting means for movement about an axis formed by said diaphragm means, said diaphragm means during operation being continuously distorted and operative to urge said contacting means against the surface of said material.

2. Apparatus for indicating variations in the height of the surface of material within a container, comprising a plurality of flexible diaphragms forming a portion of a wall of said container, said diaphragms being arranged in spaced relation at their peripheral portions and in contiguous relation at a point adjacent their center portions; means extending inwardly from such point and adapted to maintain contact with said surface; and an element extending outwardly from said flexible diaphragms and operatively interconnected with such inwardly extending means for movement as a unit about an axis formed by said diaphragms, to indicate variations in the height of the surface of the material within said container.

3. In a container for holding and discharging free flowing material at superatmospheric pressure, an apparatus for indicating the position of the surface of the material within said container, said apparatus comprising in combination, a pair of parallel flexible diaphragms disposed across an opening in a portion of, and in gas-tight relation to, said container, the central portions of said diaphragms being interconnected; a relatively thick annular member disposed between the peripheral portions of said diaphragms; means extending inwardly from the central portions of said diaphragms for contacting and following the downward movement of the surface of said material, said pressure assisting said diaphragms to urge said inwardly extending means against the surface of said material; and an element extending outwardly from such inwardly extending means for movement as a unit about a pivot formed by said diaphragms, said outwardly extending element cooperating with a scale for indicating the level of said material within said container.

4. Apparatus for indicating the decrease in level of finely-divided material such as calcium carbide and the like within a hopper which is subject to an internal pressure substantially above atmospheric pressure, comprising in combination, a pair of flexible diaphragms disposed across an opening in said hopper, the central portions of said diaphragms being contiguously disposed; an annular member disposed between and connected in gas-tight relation to the peripheral portions of said diaphragms to form, with said diaphragms, a gas-tight annular chamber; means for venting said annular chamber; means extending inwardly from the central portions of said diaphragms and adapted to contact and to follow the descending level of the surface of said material; and an element extending outwardly from the center portion of said flexible diaphragms and operatively interconnected with such inwardly extending means for movement as a unit about a pivot formed by said diaphragms.

5. Apparatus as claimed in claim 4, including a pressure actuated device operatively associated with said venting means responsive to pressure within said annular chamber.

6. In a container for holding and discharging granular and finely-divided material, an apparatus for indicating the decrease in level of said material, said apparatus comprising, in combination, a pair of flexible diaphragms, the central portion of one of said diaphragms being contiguous to the central portion of the other of said diaphragms and the peripheral portion of the innermost diaphragm being firmly secured by an annular member to the interior surface of said container; a relatively thick annular member disposed between the outer diaphragm of said pair of diaphragms and the exterior surface of said container; arm means extending inwardly from the central portions of said diaphragms and adapted to contact and to follow the level of the surface of said material; an element extending outwardly from the central portions of said diaphragms and operatively interconnected with said inwardly extending means for movement as a unit about a pivot formed by said diaphragms; a cover plate disposed against the exterior portion of said outer diaphragm, said cover plate having a slot adapted to cooperate with said outwardly extending element; and means associated with said outwardly extending element adapted to lock said apparatus in an inoperative position.

7. Apparatus as claimed in claim 6, in which the inwardly extending means is provided, adjacent the inner diaphragm, with a flange adapted to sealingly engage the inner surface of said diaphragm and with a threaded extension projecting outwardly from said flanged portion through said diaphragms; a washer having substantially the same diameter as said flange is disposed on said threaded extension; and said outer element has an internally threaded portion adapted to cooperate with said threaded extension to maintain said diaphragms, said flanged portion, and said washer in a unitary gas-tight assembly.

8. In apparatus for indicating the position of surface of material within a container comprising, in combination, flexible and resilient diaphragm means disposed across an opening in said container; means secured to said diaphragm means for resting on the surface of said material and for following variations in height of said surface within said container; and indicating means extending from the opposite side of said diaphragm means, said surface contacting means and said indicating means being connected for movement as a unit about an axis formed by said diaphragm means; and guiding means constructed and arranged to permit movement of said unit only while said diaphragm means is in a distorted condition and to prevent upward movement of said indicating means beyond a point at which such distortion is removed from said diaphragm means.

9. An indicating instrument for automatically indicating the level of material within a container comprising, in combination, a resilient diaphragm disposed across an opening in said container; means supported by said diaphragm for contacting the surface of said material and for following variations in height of the upper surface of the latter; external indicating means supported by said diaphragm and responsive to said first-mentioned means; said diaphragm under operative conditions being flexed so as to urge said contacting means positively against the surface of said material, and forming an axis about which said surface contacting means and said indicating means pivot.

10. In an instrument for indicating the descent of the level of material within a vessel, in combination, a resilient diaphragm, a rod connected at one end to said diaphragm, the other end of said rod being urged by the resiliency of said diaphragm to contact and follow the descent of the surface of said material.

11. Apparatus for indicating the level of material within a container comprising, in combination, resilient diaphragm means forming a portion of a wall of said container; material contacting means extending from said diaphragm means to the surface of said material; arm means extending outwardly from said material contacting means and arranged for movement with the latter about a pivot formed by an element of said resilient diaphragm means; and means for guiding said arm means, such guiding means being constructed and arranged to permit movement of said arm means only in a direction substantially perpendicular to the element forming said pivot to cause said resilient diaphragm means to be distorted, said diaphragm means when distorted being operative to urge said contacting means against the surface of said material.

12. Apparatus for indicating the level of material within a container as claimed in claim 11, said container having positive gas pressure therein, and said diaphragm means being formed in gas-tight relation with the wall of said container and being responsive to said gas pressure in such a manner as to assist said diaphragm means to urge said contacting means against the surface of said material.

13. Apparatus for indicating the level of carbide within a hopper of an acetylene generator, said apparatus comprising, in combination, flexible diaphragm means forming a portion of a wall of said hopper and in gas-tight relation thereto; means for contacting the surface of said carbide and connected with said flexible diaphragm means in such manner as to cause said diaphragm means to be distorted when the indicating means is in an upper position; the pressure of acetylene within said hopper acting against said distorted diaphragm means to cause the latter to straighten out and to urge said contacting means against the surface of said carbide.

HARRY J. BAKER.